United States Patent Office 3,193,569
Patented July 6, 1965

3,193,569
HYDROXY, HALO AND SULFATO C$_{2-4}$ CARBOXYLIC ACID DIESTERS OF 3,5 DI-(HYDROXYMETHYL) 4-LOWERALKYL ANILINE
Wilhelm Schmidt-Nickels, Little York, N.J., assignor to General Aniline & Film Corporation, New York, N.Y., a corporation of Delaware
No Drawing. Filed Dec. 31, 1962, Ser. No. 248,251
6 Claims. (Cl. 260—458)

This invention relates to the provision of nitrobenzyl and aminobenzyl compounds and more particularly to the provision of a novel group of nitrobenzene and aminobenzene compounds containing at least one meta-substituted fiber-reactive group as defined below. These compounds have been found to constitute highly desirable intermediates for the preparation of chromophoric compounds, including dyestuffs, reactive with textile fibers and the like.

The objects and advantages of this invention are accordingly embodied in the provision of compounds of the formula

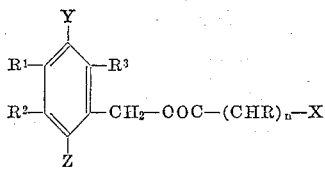

wherein R$^1$, Z and R$^3$ are selected from the group consisting of H, halogen, lower alkyl and lower alkoxy, R$^2$ is selected from the group consisting of H, halogen, lower alkyl, lower alkoxy, and $$-CH_2-OOC-(CHR)_n-X$$

R is selected from the group consisting of H and lower alkyl, $n$ has a value of 1 to 3, Y is selected from the group consisting of NH$_2$ and NO$_2$, and X is selected from the group consisting of OH and ester-forming anions of a strong acid having a dissociation constant greater than $2.0 \times 10^{-5}$.

The invention also includes processes for producing compounds of the above formula comprising reacting by heating one mole of a benzene compound of the formula

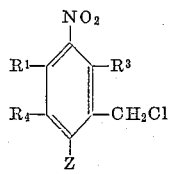

wherein R$^1$, Z and R$^3$ are selected from the group consisting of H, halogen, lower alkyl and lower alkoxy, and R$^4$ is selected from the group consisting of H, halogen, lower alkyl, lower alkoxy, and —CH$_2$Cl with an amount of a compound of the formula M—OOC—(CHR)$_n$—OH, wherein M is alkali metal, R is selected from the group consisting of H and lower alkyl, and $n$ has a value of 1 to 3, about molecularly equivalent to the number of —CH$_2$Cl groups in said benzene compound. To produce compounds wherein Y is NH$_2$, the foregoing process is followed by the step of subjecting the product thereof to the action of a reducing agent. To produce compounds of the invention wherein X is other than OH, namely an ester radical, the product of the foregoing process is esterified by reaction with a strong acid having a dissociation constant greater than $2.0 \times 10^{-5}$.

In the above formula, R, R$^1$, R$^2$, Z, R$^3$ and R$^4$ may be H or lower alkyl such as methyl to butyl or isomers thereof. R$^1$, R$^2$, Z, R$^3$ and R$^4$ may be any halogen including F or I but preferably Cl or Br, or lower alkoxy such as methoxy to butoxy or isomers thereof. R$^4$ may also be CH$_2$Cl and R$^2$ may also be $$-CH_2-OOC-(CHR)_n-X$$

$n$ has a value of 1 to 3.

X in the above formula represents OH or an ester-forming anion as defined above, the preferred anions being Cl and OSO$_3$H. Alternatively, X may represent the anion of any other strong acid such as the anions of hydrobromic, hydrofluoric, iodic, phosphoric, phosphonic, phosphinic, organic sulfonic (sulfonyloxy), trichloroacetic, dichloroacetic, chloracetic, formic acids and the like.

The fundamental reaction for producing the compounds of this invention requires the use as precursor of a nitrobenzene containing at least one meta-substituted chloromethyl group. Examples of such precursors are disclosed in the prior art including U.S. 2,768,217. These and other suitable precursors for use in the present invention may generally be prepared by reaction of an appropriately substituted or unsubstituted nitrobenzene compound with one or two moles of a chloromethylating agent such as bis-chloromethyl ether in the presence of sulfuric acid. Alternatively, chloromethylation of the nitrobenzene compound may be carried out by reaction with formaldehyde, zinc chloride and HCl.

The hydroxylic carboxylic acid salt of the formula M—OOC—(CHR)$_n$—OH, wherein M is any alkali metal but preferably potassium or sodium, are known compounds and/or are prepared in known manner. Thus, the alkali metal salt of gamma-hydroxybutyric acid is prepared by treatment of gamma-butyrolactone, or lower alkyl substituted derivatives thereof, with an aqueous alkali metal hydroxide solution. Similarly, the alkali metal salt of β-hydroxypropionic acid is prepared by like treatment of β-propiolactone or its lower alkyl substituted derivatives. The alkali metal salts of glycolic acid or lower alkyl substituted derivatives thereof may also be employed for reaction with the chloromethylated nitrobenzene precursor.

The reaction between the chloromethylated nitrobenzene precursor and the hydroxylated carboxylic acid salt is preferably carried out in a polar organic solvent for the reactants. While methanol is preferred, other suitable solvents may be employed as for example, ethanol, butanol, Cellosolves (lower alkyl and benzyl ethers of ethylene glycol), Carbitols (lower alkyl ethers of diethylene glycol), dioxane, acetone, methyl ethyl ketone, and the like. Reaction takes place at any temperature from room temperature up to the boiling point of the medium although elevated temperatures, for example at least 50° C., are preferred to accelerate the reaction. The alkali metal chloride by-product is precipitated during the reaction and readily removed as by filtration after which the desired product may be recovered or isolated if desired by evaporating the solvent from the medium.

The substituted nitrobenzene product of the process described in the preceding paragraph may if desired then be subjected to the action of a reducing agent to convert the nitro group to amino in any manner well known in the art. In such instances, it is preferred for economic reasons to dispense with a separation step and to instead treat the substituted nitrobenzene compound with the reducing agent in its alcoholic or other polar organic solvent solution. This may for example be conveniently carried out by subjecting the filtrate containing the substituted nitrobenzene compound, after removal of the by-product alkali metal chloride, to reduction by the well known catalytic hydrogenation process involving injection of molecular hydrogen, preferably under pressure, in the presence of a suitable catalyst such as Raney nickel, platinum, palladium, and/or their oxides, or combinations thereof, preferably on a carrier such as charcoal or other known equivalents thereof.

Other methods of reduction may be employed including the use of the well known reduction system containing a metal such as iron, zinc, tin or the like in a strong mineral acid such as sulfuric or hydrochloric acid or the like.

Following the reduction reaction, the resulting substituted aminobenzene compound is readily recovered, as by filtering off the catalyst and evaporating the organic solvent. The resulting substituted aminobenzene compound has the formula first given above wherein Y is $NH_2$ and X is OH. To produce the corresponding compounds wherein X is other than OH, this substituted aminobenzene compound is then esterified in known manner with a strong acid HX having a dissociation constant greater than $2.0 \times 10^{-5}$. For example, treatment with concentrated HCl or thionyl chloride yields the corresponding compound wherein X is Cl. Reaction with a sulfating agent such as sulfuric acid or pyridine-$SO_3$ complex yields the corresponding compound wherein X is $OSO_3H$. Alternatively, other esterifying acids of the type described above may be employed.

The products of this invention are surprisingly effective in the production of dyestuffs and other chromophoric compounds reactive with textile fibers, as described and claimed in my co-pending application Serial No. 248,243 filed on even date herewith. Thus, products wherein Y is $NH_2$ and X is OH, as in Example 2 below, may be diazotized and coupled with any known azo coupling component. Esterification of the resulting azo dyestuff to replace the terminal OH group by an ester group yields a dyestuff reactive with textile fibers such as cotton under alkaline conditions with liberation of HX. Compounds wherein Y is $NH_2$ and X is an ester radical as defined above may be similarly diazotized and coupled with an azo coupling component to yield a fiber-reactive azo dyestuff.

The following examples are only illustrative of the present invention and are not to be regarded as limitative. All parts and proportions referred to herein and in the appended claims are by weight unless otherwise indicated.

*Example 1*

A solution is prepared with 1900 parts by volume ethanol and 93.6 parts by weight 2,6-bis-chloromethyl-4-nitrotoluene. After dissolving is completed at the boil, 128 parts by weight of β-hydroxypropionic acid potassium salt are added and rinsed into the charge by means of 100 parts by volume ethanol. After refluxing overnight potassium chloride has separated, and is removed by filtration. All the alcohol is then evaporated on a steam bath leaving the reaction product of the structure:

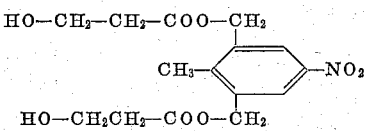

*Example 2*

A pressure shaker is charged with 200 parts by volume ethanol, 50 parts by weight of the nitro compound of Example 1, and 0.5 part by weight platinum oxide catalyst (Adam's catalyst). Hydrogen is charged to a pressure of 58 lbs. Within 20 minutes the hydrogen pressure drops to 25 lbs. Again hydrogen is added to a pressure of 58 lbs. The pressure drops to 45 lbs. within 35 minutes and remain constant for 1 hour indicating the completeness of the reduction. The catalyst is filtered off and ethanol is removed by evaporation on a steam bath. The reduction product has the structure:

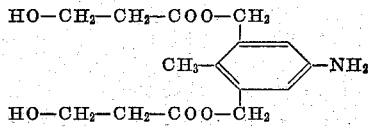

The above product is diazotized, coupled with 1-(4-sulfophenyl)-3-methyl-5-pyrazolone, and esterified with concentrated HCl to produce an azo dyestuff containing two fiber-reactive $Cl-CH_2-CH_2-COO-CH_2$ groups and yielding on cotton by the alkaline pad-cure method a bright yellow dyeing of good fastness properties. Similar results are obtained if the above product is esterified with concentrated HCl prior to diazotization and coupling.

*Example 3*

A charge of 250 parts by volume ethanol, 11.7 parts by weight 2,6-bis(chloromethyl)-4-nitrotoluene and 11.8 parts by weight gamma-hydroxybutyric acid potassium salt is heated to reflux under agitation. Potassium chloride begins to precipitate from the solution initially formed. After stirring at reflux for 2 hours the solution is filtered hot to remove the potassium chloride. The clear filtrate contains the compound of the structure:

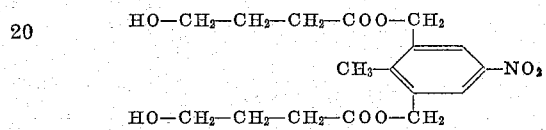

*Example 4*

The filtrate from Example 3 is charged directly into a pressure shaker. After addition of 0.3 g. platinum oxide catalyst (Adam's catalyst), hydrogen is charged to a pressure of 50 lbs. Within 40 minutes the hydrogen pressure falls to 44 lbs. and then remains constant. After removal of the catalyst by filtration the ethanol is evaporated on a steam bath. Weight of remainder=20.3 parts by weight of the reduced product of Example 3.

*Example 5*

The entire product from Example 4 is introduced into 120 parts by volume conc. hydrochloric acid. The charge is then stirred at 72–75° C. for 2½ hours, by which time the reaction product has precipitated and is filtered off at room temperature and sucked down sharply. It has the structure:

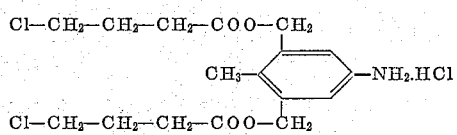

A sample of this product is diazotized and coupled with 1-(4-sulfophenyl)-3-methylpyrazolone-5. The resulting yellow dyestuff is applied to cotton as described in Example 2. The cotton is dyed yellow with similar fastness properties.

*Example 6*

A charge of 250 parts by volume methanol, 11.7 parts by weight 2,6-bis(chloromethyl)-4-nitrotoluene and 22.9 parts by weight glycolic acid potassium salt is refluxed for 15 hours. After allowing to cool to room temperature the potassium chloride formed in the reaction together with most of the excess glycolic acid potassium salt is removed by filtration. Then the methanol is evaporated on a steam bath. The remainder is dissolved in 200 parts by volume boiling ethanol. On cooling to room temperature some retained glycolic acid potassium salt crystallizes out. It is filtered off. The filtrate contains the reaction product of the structure:

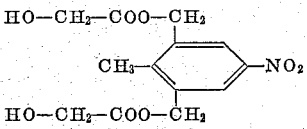

*Example 7*

The filtrate from Example 6 is charged into a pressure shaker. After addition of 0.2 part by weight platinum oxide catalyst (Adam's catalyst), hydrogen is charged to a pressure of 45 bs. Within 15 minutes the hydrogen pressure falls to 32 lbs. and then remains at 32 lbs. for 40 minutes. After removal of the catalyst by filtration the ethanol is evaporated on a steam bath. The remaining product has the structure:

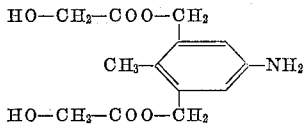

The above product, when diazotized, coupled, esterified and applied to cotton as described in Example 2, yields similar results.

*Example 8*

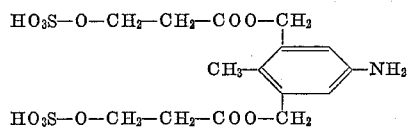

4.5 parts by weight of 2,6-bis(β-hydroxypropionato-methyl)-4-amino-toluene, prepared as described in Example 2, are introduced at below 20° C. into 10 parts by volume monohydrate (100% $H_2SO_4$). The charge is agitated at room temperature for 14 hours and drowned in ice to produce the above di-sulfato product.

The above product, when diazotized, coupled with Naphthol AS and applied to cotton by the alkaline pad-cure method (padded on cotton from an alkaline solution, dried, cured, e.g., at 150° C. and washed with detergent to remove unreacted dyestuff) yields red dyeings of good fastness properties.

This invention has been disclosed with respect to certain preferred embodiments and various modifications and variations thereof will become obvious to the person skilled in the art. It is to be understood that such modifications and variations are to be included within the spirit and scope of this invention.

I claim:
1. A compound of the formula

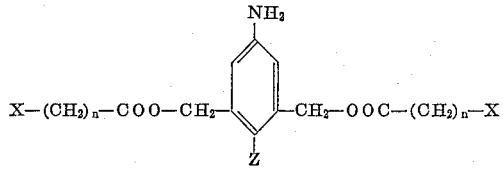

wherein

Z is lower alkyl,
n is an integer of 1 to 3, and
X is selected from the group consisting of OH, halogen and sulfato.

2. A compound of the formula

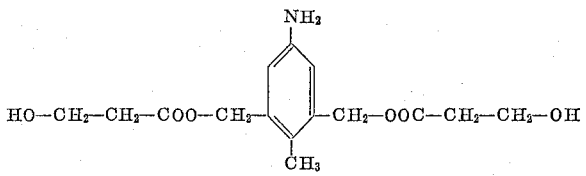

3. A compound of the formula

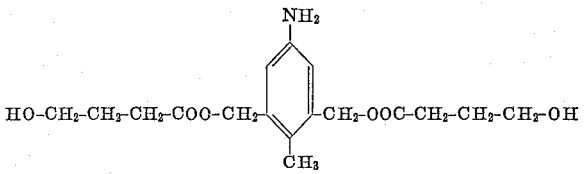

4. A compound of the formula

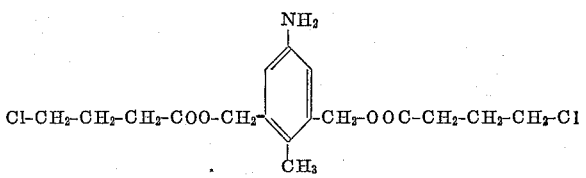

5. A compound of the formula

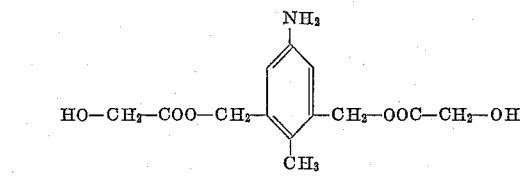

6. A compound of the formula

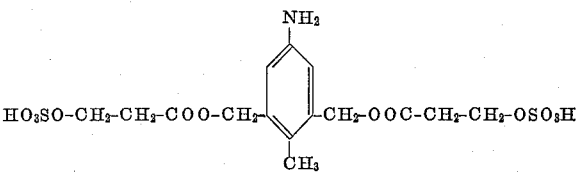

References Cited by the Examiner
UNITED STATES PATENTS
2,687,941   8/54   Salvin et al. _____ 8—57

OTHER REFERENCES
Lyons et al., J.A.C.S., vol. 39, 1727–1750 (1917).
Ridgway et al., Journal of Economic Entomology, vol. 53, p. 690 (1960).
Hopff et al., Helvetica Chimica Acta, volume 44, pp. 367–79 (1961).

LORRAINE A. WEINBERGER, *Acting Primary Examiner*.

LEON ZITVER, *Examiner*.